United States Patent Office 3,360,984
Patented Jan. 2, 1968

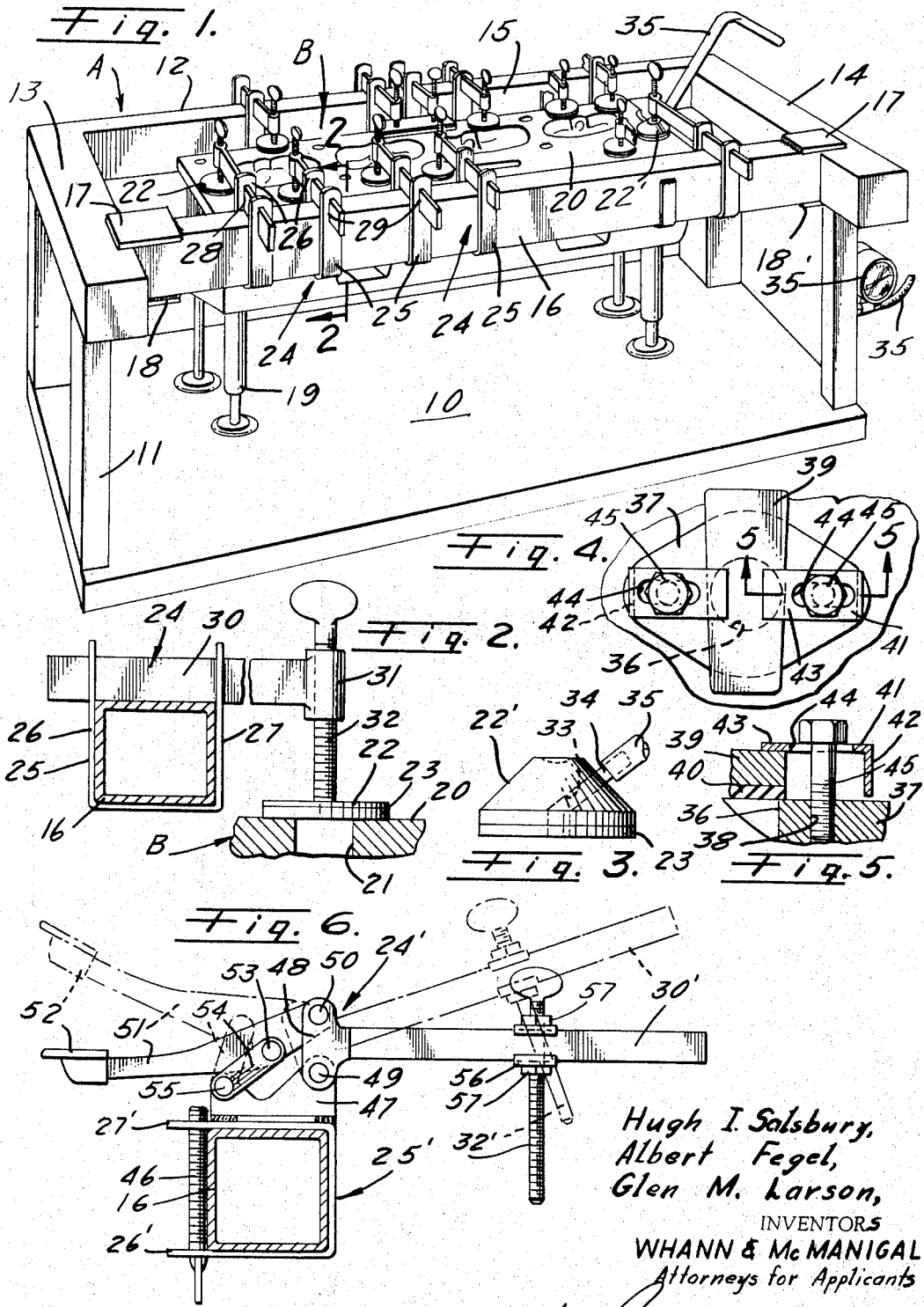

3,360,984
UNIVERSAL TESTING APPARATUS FOR ENGINE CYLINDER HEADS AND SIMILAR PARTS
Hugh I. Salsbury, Pasadena, Albert Fegel, Whittier, and Glen M. Larson, Los Angeles, Calif., assignors to Irontite Products Co., Los Angeles, Calif., a corporation of California
Filed Oct. 20, 1965, Ser. No. 498,610
5 Claims. (Cl. 73—49.7)

ABSTRACT OF THE DISCLOSURE

Apparatus for testing engine cylinder heads by subjection to a fluid pressure, which includes adjustable rails providing supports for manually operable clamps having slidable adjusting movement longitudinally and transversely of its supporting rail so as to position an associated pressure applying screw thereof in operative relation with an underlying closure member for a port opening in the cylinder head to be tested.

In an alternative arrangement, the clamp includes a toggle mechanism for swinging the pressure applying screw into and out of its operative position of use.

---

The present invention relates generally to the testing of engine parts such as cylinder heads and the like, by means of a pressurized fluid, and is more particularly concerned with improved apparatus for carrying out the testing operations.

Heretofore, engine cylinder heads and similar parts have been tested by using fluids under pressure in the water jacket cavities of the head which has had its connection ports sealed off. By utilizing a soap solution or other suitable solution it is then possible to locate leaks, cracks, etc. which may be present in the damaged head. The damaged portion of the head can then be repaired by conventional procedures.

One of the main problems attending the use of conventional procedures in the testing of engine parts such as cylinder heads results from the difficulties which arise due to the lack of suitable means for quickly and effectively blocking off the many ports leading to the jacket cavities so that the pressurized fluid can be applied.

In carrying out the testing procedures by utilizing the presently known equipment, it is customary to provide a test plate and gasket which has to be custom made for each type and size of cylinder head. In view of the great number of engines, particularly in the automotive industry, which differ as to design configuration, size, etc., any testing facility which desires to provide complete testing service will of necessity be required to maintain a large number of expensive test plates. This number may be of the order of 500 or more.

Another inherent disadvantage with respect to the present procedures utilizing special testing plates as conventionally constructed, resides in the inability to make the necessary repairs to the cylinder head being tested, while the plate remains secured in its testing position. The present procedures and available means for the testing of cylinder heads therefore becomes a very expensive and time consuming procedure.

With the foregoing in mind, the present invention has for one of its objects the provision of testing apparatus which is of simple design and economical construction, which can be universally used with engine cylinder heads of different types and sizes; which can be quickly and easily set up and applied to the part to be tested; which will not inhibit the testing procedure; and which will permit the making of repairs without having to disconnect or remove the testing apparatus, thus enabling its use for further testing after the repairs are made.

Another object is to provide testing apparatus of the character described which includes unique closures for sealing off the connection ports of the part to be tested, even though the ports may vary considerably as to their diameters.

Another object is to provide universal closure means for sealing the flanged connection ports of engine cylinder heads, which may vary as to port diameter size.

Still another object is to provide a port closure which is arranged to connect a pressurized fluid source with the interior cavities of an engine cylinder head or similar structure for testing purposes.

It is also an object to provide an improved quickly applicable clamping device for holding port sealing members in a sealing position.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view of apparatus according to the present invention;

FIG. 2 is an enlarged fragmentary sectional view taken substantially on line 2—2 of FIG. 1;

FIG. 3 is a detailed elevational view disclosing the construction of one of the sealing members for supplying fluid to an engine cylinder head cavity;

FIG. 4 is a face view of a universal closure for flanged port connectors of an engine cylinder head structure;

FIG. 5 is a fragmentary sectional view taken substantially on line 5—5 of FIG. 4; and FIG. 6 is a side elevational view of an alternative device for clamping the port closure member in sealing position.

Referring more specifically to the drawings, for illustrative purposes, the testing apparatus of the present invention is disclosed in FIG. 1 as comprising generally a skeletal frame structure A within which an engine part B such as a cylinder head is supported for testing procedures to ascertain the presence of any cracks or fissures which might cause leakage, so that they can be repaired by conventional methods and procedure.

More specifically, the frame structure includes a base plate 10 to which corner posts 11 are secured for supporting an upper frame structure 12 in an elevated position above the base plate.

The upper frame structure is of rectangular configuration and is of sufficient size to encompass a cylinder head or similar part supported upon the base plate in a testing position. In order that the upper frame structure may be accommodated to different sized parts, the frame structure is made adjustable, at least in a lateral direction.

As shown in FIG. 1, the upper frame structure includes end rails 13 and 14, disposed in parallel relation and connected at corresponding ends to a side rail 15 by welding or otherwise to form a rigid frame structure which is open at the opposite side. By constructing the upper frame structure so as to be open on the side opposite the side rail 15, placement and proper positioning of the part therein for testing will be greatly facilitated. The open side of the upper frame structure is closable by means of a removable side rail 16 which is provided at each end with an upper pad projection 17 and a lower pad projection 18 which are adapted to project outwardly over the adjacent upper and lower surfaces of the associated end rail and thus connect the side rail 16 for lateral sliding movement towards and away from the side rail 15 to a desired position.

The engine part B which is to be tested will be supported in a test position elevated above the base plate 10 by means of spacing elements which may comprise shims and blocks, or as shown may be supported upon a plurality of adjustable jacks 19. In the usual test position, the engine part B, which is to undergo test, will be supported with its usual engine mating gasket engaging surface, as indicated at 20, so that it will lie in an exposed position closely below or within the upper frame structure. The surface 20 of the part, will have ports 21 which open into the mating surface and establish communication with internal cavities of the part which provide cooling jackets for the circulation of a cooling medium.

In order to properly test the engine part, the ports must be closed in order that a pressurized fluid can be supplied to the jacket cavities and permit a suitable soap solution or other solution to be utilized in locating leaks or cracks which are to be repaired.

One of the important advantages of the herein described invention resides in the flexibility and ease of operation of the port sealing instrumentalities and the connection of pressurized fluid with the cavity.

Provision is made for individually sealing each port by means of a disc-like member 22 which may be made of a suitable metal or other material and provided with a liner 23 on one face of a sealing material so that when the member is applied over a port opening and pressure exerted thereon, the port opening will be closed and sealed.

Pressure applying devices, as generally indicated by the numeral 24, are provided for the sealing closure members 22, these devices being supported from the upper frame structure, and preferably from the side rails 15 and 16.

As best shown in FIGS. 1 and 2, the pressure applying devices include a U-shaped strap member 25 which is arranged to closely receive the side rail therein, so that when applied to the side rail the end portions of the respective legs 26 and 27 will project beyond the adjacent perimeter portion of the side rail. The projecting end portions are provided with axially extending narrow slots 28 and 29 respectively, which are transversely aligned and adapted to receive an elongate bar 30 endwise therethrough. The bar is thus held in a position in which it extends outwardly over the mating surface 20 of the engine part. Moreover, the bar 30 and the strap member 25 cooperate to adjustably support the pressure applying devices in a proper upright position which may be adjustably moved along the associated side rail to facilitate prepartion of the engine part for testing. The outermost end of the bar 30 carries a head portion 31 having an internal threaded bore for receiving and supporting a manually operable pressure applying screw 32 therein. The adjustments mentioned permit the pressure applying screw to be properly positioned and brought into end engagement with an associated closure member 22.

In order to facilitate supplying a pressurized fluid to the interior cavity of the part, one of the closure members 22 is modified in construction as shown in FIG. 3. For this purpose, instead of being of flat disc shape, the member is made frusto-conical as indicated at 22' and provided with an internal bore 33 which communicates at one end with the sealing surface of the liner 23, and at its other end with a tubular connector 34 for a pressurized fluid supply conduit 35. The supply conduit may lead to a source of fluid pressure containing a suitable pressure gage 35' at one end of the apparatus.

Most engine cylinder heads and similar parts are provided with a flanged port connection such as shown in FIG. 4 wherein a port 36 will be surrounded by a connection flange 37 which contains threaded bores 38 diametrically positioned on opposite sides of the bore for receiving the mating flange connector bolts. These bores may vary in diameter on different engines and have different spacing between the threaded bores 38. In order to facilitate closure of these bores, a universal closure means is provided which comprises a tapered or wedge shaped closure member 39 which may be provided with a sealing liner 40. A closure member as thus constructed can be longitudinally shifted so as to accommodate sealing of different sized ports.

Holding down clips 41 are of L-shape with a short leg 42 adapted to engage the face of the flange 37, and a long leg 43 which is arranged to extend over and engage the upper surface of the closure member 39. The leg 43 of each clip is provided with an elongate slot 44 which receives a securing bolt 45 and permits adjustment of the clip for different spacings of bores 38—38.

Referring to FIG. 6, there is disclosed an alternative device 24' for clamping the port closure members in sealing position. This device differs from the previously described device 24 in that the alternative includes means for quickly actuating the pressure means into and out of operative position. Similar elements to those of the device 24 have been indicated by primed numbers.

More specifically, it will be noted that the U-shaped strap member 25' is shifted 90° from that shown in FIG. 2, and in this case the legs are arranged to be clamped by means of a clamping crew 46 to the rail member 16.

The strap member 25' in this case has a supporting bracket 47 fixedly mounted as by welding or other suitable means thereon so as to extend above the rail member.

The innermost end of the bar 30' is in this case provided with a T-head end portion 48, one end of which is connected by a pivot 49 to the bracket 47. The other end of the head is connected by a pivot 50 to one end of a manually movable lever 51 the outer end of which carries a digitally engageable end pad 52 by means of which the lever may be swung about its pivot.

The lever 51 is connected at a point spaced from its pivot 50 by a pivot connection 53 to one end of a link 54 having its other end connected by a pivot 55 to the bracket 47 in spaced relation to the pivot 49. As thus arranged, the link 54 and the portion of the lever 51 lying between the pivots 50 and 53 cooperate to form a toggle which will move past a dead center position, when the bar 30' is in a substantially horizontal extending position as shown in full lines. In this position, the bar is locked against movement to the dotted line position by the exertion of a force at the outer end of the bar.

In this arrangement, the pressure applying screw 32' is supported upon a bracket 56 having sliding engagement with the bar. The bracket may be secured in an adjusted position on the bar by means of suitable lock nuts 57—57. The pressure applying screw 32' is adjustable in the same manner as the screw 32.

Various modifications may suggest themselves to those skilled in the art without departing from the spirit of our invention, and, hence, we do not wish to be restricted to the specific form shown or uses mentioned, except to the extent indicated in the appended claims.

We claim:

1. Apparatus for the fluid pressure testing of an engine part such as a cylinder head or the like having a fluid circulating jacket containing communicating ports which open into a mating connecting surface, comprising:
   (a) means for supporting the part in a test position with its mating surface exposed;
   (b) a skeletal frame structure positioned adjacent said surface, including a pair of fixed end rails and at least one movable rail extending between said end rails and supported thereon for lateral positioning movements adjacent said surface; and
   (c) a plurality of port closure structures, each of said structures including a closure member adapted to cover and seal one of said ports, and a pressure applying device for each closure member independently adjustably positionable along and laterally of one of said rails.

2. A universal closure for an engine part port having a connection flange with threaded openings positioned diametrically on opposite sides of said port, said closure comprising:
   (a) a longitudinally tapered closure member having a sealing face for engaging said flange and covering the port, said closure being longitudinally adjustable to accommodate it to ports of different diameter; and
   (b) a pair of L-shaped retaining clips positionable on opposite sides of said closure member, each of said clips having a short leg of a length corresponding substantially to the thickness of the closure member; and
   (c) a long leg for extending over the adjacent edge margin of the closure member, when the short leg is in end engagement with the flange, said long leg having an elongate slot for receiving a holding screw threaded into one of the threaded flange openings.

3. Apparatus for the fluid pressure testing of engine cylinder heads and similar parts having a fluid circulating jacket containing communicating ports which open into a mating connecting surface, comprising:
   (a) means for supporting the part in a test position with its mating surface exposed;
   (b) a frame structure including a pair of parallel side rails positioned generally above said surface, and being supported for relative positioning movements towards and away from each other;
   (c) closure members respectively adapted to cover one of said ports; and
   (d) a plurality of devices for mechanically independently applying a retaining pressure against each of said closure members, each of said devices comprising an elongate manually operable member for end engagement with one of said closure members for mechanically applying a pressure axially of said member in a direction towards the associated closure member, and means for supporting each of said pressure applying members on one of said rail members, said supporting means being adjustable to shift its pressure applying member longitudinally and laterally of the rail to bring the position of the pressure applying member into accord with the position of the associated closure member.

4. Apparatus according to claim 3, wherein the supporting means comprises a U-shaped strap member adapted to receive one of said rails therein, with the end portions of the legs projecting beyond the adjacent periphery of the rail and containing aligned openings therein; and an elongate bar having one end portion positioned in said openings and being longitudinally adjustably movable therein, and at its other end having the pressure applying member mounted thereon.

5. Apparatus according to claim 3, wherein the supporting means comprises a U-shaped strap member; a clamping screw interconnecting the leg ends of said member in clamped relation around one of said rails; an elongate bar member pivoted at one end on said strap member for swinging movements in a plane substantially at right angles to the rail axis; manually operable toggle means for swinging said bar between a non-clamping and a clamping position, the toggle means being operative in the clamping position to lock the bar against movement to a non-clamping position by an external force applied against its non-pivoted end; and means for adjustably supporting the pressure applying member on the bar for selective movement to different positions along its length.

References Cited
UNITED STATES PATENTS

| | | | |
|---|---|---|---|
| 282,961 | 8/1883 | Crispin | 269—91 |
| 1,554,637 | 9/1925 | McKee. | |
| 2,408,586 | 10/1946 | Spievak | 269—94 |
| 2,815,052 | 12/1957 | Krasnow | 269—94 XR |
| 3,221,539 | 12/1965 | Evans et al. | 73—45.2 |

FOREIGN PATENTS

| | | |
|---|---|---|
| 208,234 | 8/1955 | Australia. |
| 581,002 | 8/1959 | Canada. |

DAVID SCHONBERG, *Primary Examiner.*

LOUIS PRINCE, *Examiner.*

J. NOLTON, *Assistant Examiner.*